Patented July 30, 1940

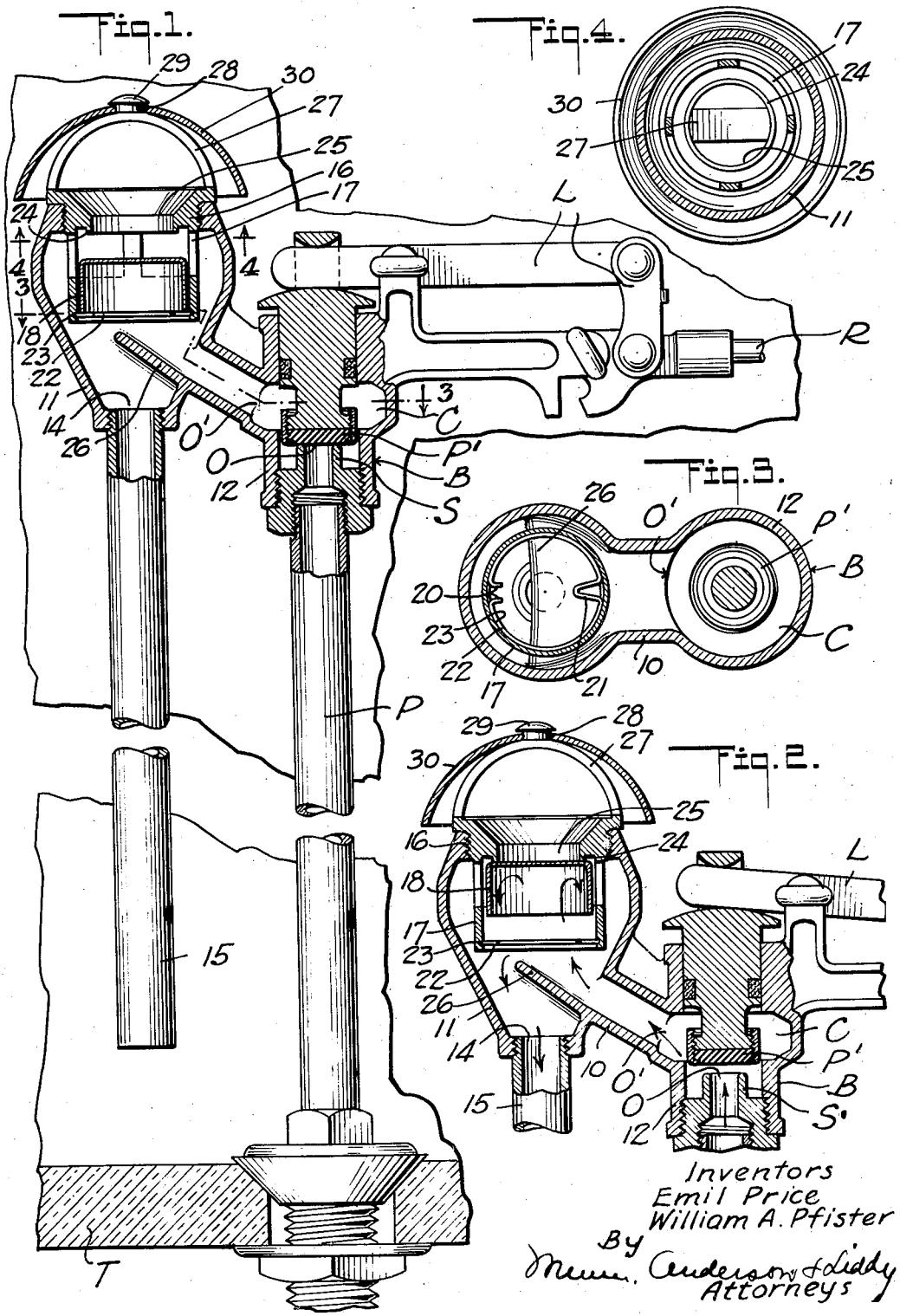

2,209,473

UNITED STATES PATENT OFFICE 2,209,473

SILENCING AND ANTISIPHONING DEVICE

Emil Price and William A. Pfister, Los Angeles, Calif.

Application January 16, 1939, Serial No. 251,088

5 Claims. (Cl. 137—69)

This invention relates to silencing and antisiphoning devices of the general character embodied in our U. S. Patent No. 2,086,637, issued July 13, 1937, wherein means is described and claimed, which in its association with a water closet or other container supplied with liquid from a source of pressure supply such as the domestic source employed for the water systems of buildings, functions to conduct water to the tank silently and in a manner to prevent the back siphoning of water from the tank to the supply system with possible contamination or pollution of the water, making it unfit and dangerous for drinking and other purposes.

An object of the present invention is to provide a device as above described, which is particularly characterized by its structural simplicity, enabling a lesser number of parts to function with positive responsiveness and maximum efficiency in preventing back siphoning of liquid and in causing the tank to fill quietly.

Another object of the invention is to provide a silencing and antisiphoning device in which the minimum number and relationship of parts employed permits extreme ease in assembling the device in its operative association with a ball cock.

A further object of the invention is to provide a device which is protected against tampering by extremely simple means, preventing displacement and/or removal of the device from its operative relation to a ball cock except by the use of a special tool or instrument.

With these and other objects in view, the invention is comprised in the combinations, arrangements and functional relationships of elements as set forth in the following specification and particularly pointed out in the appended claims.

In the accompanying drawing,

Figure 1 is a vertical sectional view with portions in elevation, and illustrating the invention applied to a ball cock;

Figure 2 is a fragmentary sectional view showing the invention and the ball cock as in Figure 1, and illustrating the positions of working parts during the filling operation;

Figure 3 is a transverse sectional view taken on the line 3—3 of Figure 1;

Figure 4 is a detail transverse sectional view taken on the line 4—4 of Figure 1.

Referring specifically to the drawing, the invention is shown associated with a water closet supply tank T in which is supported a vertical pipe P adapted for connection to a domestic source of water supply, and provided at its upper end with a ball cock B having a valve seat S and a plug valve P' connected by suitable linkage L to a rod R terminating at its free end in a float (not shown). In the fully raised position of the float, the plug P' co-acts with the seat S to close an inlet port O, whereas in lowered positions of the float the plug P' will be raised to open the port O, all of which is well known to those familiar with the art and, therefore, needs no further description.

The inlet port O communicates with a chamber C in the body of the ball cock, and the chamber is further provided with an outlet port O' from which water is discharged through a passage in a tubular extension 10 of a valve casing 11 cast integral with the body 12 of the ball cock as clearly shown in Figures 1, 2 and 3.

The valve casing 11 is provided at its lower end with an outlet 14 to which is connected the upper end of a filling tube 15 depending from the valve casing to a point adjacent the bottom of the tank T. The valve casing 11 is open at its upper end to provide an atmospheric vent and is internally threaded to receive the externally threaded portion 16 of a valve cage 17 depending into the valve casing. The cage has mounted therein a valve 18 in the form of an inverted cup normally gravitating to rest upon inward projections 20 and 21 (Figure 3) of a spring retaining ring 22 which is sprung into an annular groove 23 in the valve cage.

In its lowered position shown in Figure 1, the valve 18 is clear of an annular seat 24 surrounding a vent port 25 in the cage 17 so as to vent the interior of the valve casing to atmosphere; whereas in the raised position of the valve, it engages said seat to seal the vent port.

Positioned at the outlet of the passage of the tubular extension 10 is a wall 26 spanning a portion of the interior of the valve casing 11 at a point below the cage 17, and leaving a portion of the casing clear to provide for the flow of water from the ball cock B through the valve casing around the free end of the wall 26 to the filling tube 15.

The disposition of the wall 26 is such that the wall functions as a baffle or deflector to direct water from the extension 10 into the open bottom of the inverted cup-shaped valve 18, so that the water, in impinging against the valve, will raise the latter and close the vent port 25.

The upper portion of the cage 17 is provided with an axially curved bar 27 extending diametrically of the cage and having a centrally located pin 28 freely receiving and riveted at 29 over a protector 30 in the form of a dome-shaped hood of somewhat larger diameter than the exposed annular portion of the cage and extending axially to a point approximately opposite the upper end of the valve casing 11.

As the protector 30 is free to rotate on the valve casing and yet cannot be removed therefrom, access to the valve and interior of the casing is precluded, and removal of the cage from the casing is prevented except through the use of a suitable tool or instrument adapted to be inserted between the protector and cage for coaction with the latter in rotating same.

The operation of the invention is as follows: With the tank T filled to a predetermined level, the plug P' will be closed by the raised float, and the valve 18 will occupy the open position shown in Figure 1, to permit the free passage of air through the vent port 25, which, it will be understood, is at all times above the maximum level of water in the tank. Thus it will be clear that air from atmosphere will be free to enter the valve casing through the open vent port 25 so as to break any vacuum induced in the pipe P, and positively prevent any water being withdrawn from the tank into the pipe P, possibly to other fixtures through the supply lines, by siphonic action in the pipe P.

Upon refilling the tank T through the opened plug P' as is effected in the lowered position of the float in accordance with the positions of the parts in Figure 2, water discharging from the body 12 of the ball cock B will be directed by the wall 26 to impinge against the interior surface of the valve 18 so as to instantly raise the latter to its closed position with respect to the vent port 25 as shown in this figure. Thus it will be clear that as no air is permitted to enter the piping system during the tank filling operation, water will be delivered to the tank through the pipe 15 in a silent manner. When the tank is filled and the plug P' closes the inlet port O, the valve 18 gravitates to its open position with respect to the vent port 25 so that air is again free to enter the system and prevent back siphoning of water from the tank by induced suction in the pipe P.

From the foregoing description of the structure of this invention, it will be manifest that its functions are carried out with a minimum number of simply constructed parts capable of being cheaply embodied in a conventional ball cock, and of being assembled and disassembled with the utmost ease and dispatch, and that in addition the mechanism is adequately protected in a simple manner against access and tampering except by the use of a specially constructed tool.

What is claimed is:

1. An air inlet valve comprising a valve casing having a chamber provided with an atmospheric vent and an outlet; the casing having a tubular extension defining a water passage; means defining a partition wall in the casing leading from said water passage and partly spanning the casing to leave a passage for water from said extension around the wall to said outlet; a cage having a vent port and being threadedly mounted in said atmospheric vent to project into the casing; a valve movably mounted in said cage to gravitate therein to a lowered position opening said vent port when no water is flowing into the casing, and to be raised by incoming water from said water passage, directed by said wall to impinge against the valve and cause the latter to close the vent port so long as water is flowing into the casing; and a protector permanently secured to the cage and freely rotatable thereon in covering relation to the exposed part of the cage so as to prevent access to the interior of the cage and unscrewing of the cage except by the use of a special tool or instrument.

2. An air inlet valve comprising a valve casing having an atmospheric vent, a water inlet, and a water outlet; a cage having a vent port and threadedly mounted in said atmospheric vent to project into the casing; a valve mounted in said cage to gravitate to an open position with respect to said vent port and to be raised to close the latter by water entering the casing through said inlet; and a protector permanently secured to, and freely rotatable on the cage in covering relation to the exposed part of the latter so as to prevent access to the interior of the cage and removal of the cage from the casing except by use of a special tool.

3. An air inlet valve comprising a valve casing having an atmospheric vent, a water inlet, and a water outlet; a cage having a vent port and threadedly mounted in said atmospheric vent to project into the casing; a valve mounted in said cage to gravitate to an open position with respect to said vent port, and to be raised to close the latter by water entering the casing through said inlet; the cage having a bridging bar provided with a pin; and a dome-shaped protector receiving said pin and permanently secured thereby to the cage for free rotation in covering relation to the exposed part of the cage so as to prevent access to the interior of the cage and prevent rotation thereof by the protector.

4. In an air inlet valve, a valve casing having a fluid vent; a valve controlling said vent; means mounting the valve in the casing for opening and closing movements with respect to the vent and for insertion and removal only through said vent; and means mounted for free rotation on the first means and permanently connected thereto in a position to co-act therewith in preventing access to the interior of the casing for removal of the valve except by use of a special tool, and while leaving said vent free for the control of fluid therethrough solely by the valve.

5. In an air inlet valve, a valve casing having a fluid vent; a valve controlling said vent; means insertable into and removable from the casing through said vent by relative rotation between said means and casing, for mounting the valve in the casing for opening and closing movements with respect to said vent; and a protector covering said means and permanently connected thereto for free rotation in a position to prevent removal of said means and valve from the casing except with a special tool, and without interfering with the control of fluid through the vent solely by the valve.

EMIL PRICE.
WILLIAM A. PFISTER.